Patented Apr. 24, 1945

2,374,407

UNITED STATES PATENT OFFICE 2,374,407

FOOD PRODUCT

Richard J. Block, Scarsdale, and Arthur P. Hellwig, Hartsdale, N. Y., assignors to C. M. Armstrong, Inc., a corporation of New York No Drawing. Application January 8, 1942, Serial No. 425,964

2 Claims. (Cl. 99—14)

This invention relates to a food product and the method of making it and, more particularly, to a food of abnormally high nutritive value in human nutrition, the food including cow's milk proteins and admixed sources of certain amino acids, the presence of which increases the utilization of the milk proteins when used as a food for infants, convalescents, or human beings generally.

The invention comprises a mixture of proteins of cow's milk and admixed sources of cystine and tryptophane and preferable also of arginine, isoleucine and glycine.

The invention provides an enriched milk product that is of very high nutritive or biological value as a food for humans as determined, for example, by the ratio of the increase in weight of an infant to the weight of the food consumed or by the proportion of the food consumed that is utilized by an adult. The product is not only highly nourishing but also palatable and stable.

In making the improved food product, there is used as the base to be enriched for human consumption cow's milk proteins in about the proportion to each other in which they normally occur in the milk. These proteins may be used in the form of liquid milk, evaporated milk, condensed milk, whole milk powder, skimmed milk powder, or other commercial mixture. For best results, the base material includes the solids of whole milk.

To the base material there is added sources of cystine and tryptophane, and, for best results, also sources of arginine, isoleucine and glycine. These sources of the amino acids may be the free amino acids themselves or proteins that are adapted in metabolism to provide the amino acids in free or combined form in the proportions required.

Suitably there is also added to the composition the vitamins and minerals that are known to be deficient in cow's milk for human consumption as, for example, vitamins $B_1$, C, and D, and compounds of copper, iron, or other metals, these admixtures if used being incorporated in the quantities that are required to correct the known deficiencies of them.

As a source of cystine, there is used a soluble protein that is relatively high in cystine content as, for example, egg albumen, lactalbumin, or lactoglobulin. When one of these proteins is incorporated, it is used in the proportion of about 30 to 50 parts for 1 part of admixed cystine required in the finished composition. Also there may be used cystine itself or methionine which, during metabolism is convertible to cystine. In case the methionine is used, it is preferably incorporated in somewhat larger proportion than the proportion of cystine required, say in the ratio of about 120 parts of methionine for 100 parts of cystine.

As a source of tryptophane, there may be used blood fibrin, lactalbumin, or tryptophane itself. When blood fibrin is used, its proportion should be about 20 to 30 parts for 1 part of tryptophane required. Lactalbumin if used should be employed in the proportion of about 50 parts to 1 part of tryptophane to be supplied.

As a source of arginine there may be used the free amino acid, gelatine, or blood fibrin, the latter two if used being in the proportion of about 10 parts to 1 part of arginine required.

As a source of isoleucine, there may be used blood fibrin or egg albumen in the proportion of about 20 parts for 1 part of the isoleucine required, or there may be used isoleucine itself.

As a source of glycine there may be used the free amino acid, gelatine, or other protein known to be relatively rich in glycine, in the proportion of about 3 parts to 1 part of glycine required.

The proportions of the various amino acids that are to be added to the cow's milk proteins should be adequate to give the necessary increase in nutritive value of the protein mixture without adding such an excess of the amino acids as to cause unnecessary expense or to destroy the desired balance of amino acids in the finished product. Proportions that have been found to be particularly satisfactory are shown in the following table:

| Added amino acid | Proportion, in per cent of cow's milk protein | |
|---|---|---|
| | Preferred | Satisfactory range |
| Cystine | 2 | 1 to 3 |
| Tryptophane | 0.5 | 0.2 to 1 |
| Arginine | 1 | 0.5 to 2 |
| Isoleucine | 1 | 0.5 to 2 |
| Glycine | 3 | 1 to 5 |

Flavoring agents and water may be added as desired. Also a conventional food preservative in a usual proportion may be incorporated, as, for example, 0.1% or so of sodium benzoate on the weight of total liquid food.

Improved milk products made as described are particularly desirable for the feeding of infants, growing children, and persons suffering or recovering from wasting and debilitative diseases, to improve physical condition before surgical operations, during pregnancy and lactation, and to speed recovery after the administration of sulfanilamide and other "sulfa" drugs, by supplying a protein food of very high nutritive and detoxicating value.

The invention will be illustrated in greater detail by description in connection with the following illustrative examples of the practice of it.

In these examples, as elsewhere herein, proportions are expressed as parts by weight except as otherwise specifically stated.

Example I

Enriched milk including cystine is made as follows:

One part of cystine is dissolved in 175 parts of hot water by the addition of 5 parts of approximately 18% hydrochloric acid. When all the cystine has dissolved, 10 parts of gelatine are added and the solution is stirred and boiled gently until all of the gelatine has dissolved. The solution is then cooled to about 40° C. and 10 parts of finely powdered blood fibrin is added and then stirred in so that no lumps remain. To this solution there is added a good grade of commercial pepsin (Fairchild Bros. and Foster 1 to 12,000) in the proportion of 0.1 part for 100 parts of the solution. The resulting mixture is then incubated at about 40° C., with intermittent stirring, for 2 to 3 hours or so.

At the end of this time the pepsin is inactivated by heating to boiling or a somewhat lower temperature.

One part of sodium chloride is added to the hot solution at this point, for the purposes of improving the taste of the final mixture. Sodium benzoate (0.2 part) or other conventional preservative may also be added.

The resulting solution or peptic digest, while still warm, is adjusted to a pH of approximately 6 with sodium hydroxide added in a 40% aqueous solution.

The solution including the solubilized cystine is then cooled to 37° C. or lower and a small amount of it is added to 15 parts of egg albumen and the whole thoroughly stirred, suitably the egg albumen having been previously swollen by soaking in water or a carbohydrate dispersing agent being used to promote the dispersion of the dry albumen. The thick paste so made is gradually thinned by stirring in more and more of the peptic digest until all of the latter has been added.

The egg albumen is now completely in solution, the solution being of low viscosity at room temperature (25 to 30° C.) but becoming somewhat viscous after remaining in the refrigerator overnight.

Approximately 30 cc. (2 tablespoons) of this solution are added to 1 glass of cold milk. The resulting mixture contains sources of cystine, tryptophane, arginine, isoleucine and glycine in proper ratios and is quite palatable but the palatability is increased by the addition of such flavors as vanilla or chocolate.

Example II

Milk containing solubilized cystine but no substantial amount of admixed tryptophane is made as described in Example I except that the incorporation of fibrin is omitted.

Example III

The procedures of Examples I and II are followed except that the compositions including sources of amino acids for addition to the milk proteins are converted to dried, solid form before the said addition. Thus, aqueous compositions including the amino acids or assimilable compounds containing the acids may be evaporated by spray drying, drum drying, or vacuum drying at low temperatures, the vacuum drying being used when any ingredient present is subject to coagulation or other objectionable change under drying at higher temperature. Egg albumen, being particularly susceptible to injury on drying at moderately elevated or higher temperatures, is preferably withheld and added after the drying of the other ingredients has been completed, in those cases in which egg albumen is incorporated and the whole composition is to be in dried condition.

In the various examples given above, sources of arginine, isoleucine and glycine may be omitted if the effect of the admixture of these amino acids is not desired. Particularly satisfactory nutritive values in human nutrition, however, require the admixture in the milk proteins of sources of all the five amino acids, cystine, tryptophane, arginine, isoleucine, and glycine.

The food described is intended primarily for use as a supplement for other foods or as part of a conventional diet, the enriched food of the present invention replacing in such diet unenriched cow's milk or cow's milk proteins.

A typical feeding experiment proving the high nutritive value of the enriched milk is described below.

Twenty young litter mate male rats were divided into two batches, each batch having an average weight within one gram of 65 grams. One batch was fed on the diet A and one batch on diet B of the compositions shown in the table plus usual vitamin enrichment that was the same in both cases.

| Ingredient | Diet A | Diet B |
| --- | --- | --- |
|  | Per cent | Per cent |
| Whole milk powder | 30 | 22 |
| Hydrogenated cottonseed oil (Crisco) | 15 | 15 |
| Codliver oil | 5 | 5 |
| Sugars | 48 | 54 |
| Mendel salts (mineral supplement) | 2 | 2 |
| Gelatin (source of arginine and glycine) |  | 0.6 |
| Fibrin (source of tryptophane and isoleucine) |  | 0.3 |
| Egg albumin (source of cystine primarily and some tryptophane, arginine and isoleucine) |  | 1.0 |
| Cystine |  | 0.06 |
| Total | 100 | 99.96 |
| Total protein content (N×6.25) | 7.9 | 7.7 |

The proportions of the several amino acids added in diet B by the ingredients beginning with gelatin are approximately as follows:

*Added amino acid in diet B, percent of milk protein*

| | |
| --- | --- |
| Arginine | 1.9 |
| Cystine (including methionine) | 2.4 |
| Glycine | 3.6 |
| Tryptophane | 0.5 |
| Isoleucine | 2.2 |

The litter male rats that were fed, 10 rats on diet A and 10 rats on diet B, showed the following average changes of weight per rat as determined at different periods of the test:

| Total days of feeding | Average gain in weight in grams on— | |
|---|---|---|
| | Diet A | Diet B |
| 10 | ¹—3.3 | 8.4 |
| 20 | 1.6 | 26.9 |
| 30 | 11.8 | 43.9 |
| 40 | 21.2 | 63.9 |
| 50 | 28.5 | 78.9 |
| 60 | 24.3 | 92.3 |
| 70 | 37.8 | 104.3 |

¹ Loss.

Not all of the extra gain in weight of the rats fed upon the enriched diet B is due to the additional nutritive value of the food. A part of the gain is due to the fact that the rats fed upon the diet B ate more of that food than the other rats ate of diet A.

When the total gain in weight in grams of all the rats of each batch during a given period is divided by the total grams of protein consumed by those rats during that period, there is found to be, however, a large increase in the nutritive value of the enriched milk solids constituting diet B. The ratio of the nutritive value so calculated for diet B, as compared to the nutritive value of diet A (taken as 1), for the various periods of feeding are shown in the following table.

| Total days of feeding | Ratio of nutritive value of Diet B to Diet A |
|---|---|
| 10 | Infinite |
| 20 | 11.8 |
| 30 | 3.2 |
| 40 | 2.0 |
| 50 | 1.7 |
| 60 | 2.6 |
| 70 | 1.9 |

The ratios for the first two periods are more or less meaningless inasmuch as there was the complication of the initial loss in weight of the rats which were fed on the milk not containing the enriching amino acids. At the same time, it must be recognized that the quick response shown during the first 10 days by the rats on diet B, as contrasted with the loss on diet A, is a feature of advantage.

It will be understood that feeding tests on rats are indicative of the nutritive values of foods for humans.

In one embodiment of the invention, the sources of the amino acids in dried form are distributed as a prepared mix for incorporation, as a fortifier or enricher, into cow's milk or cow's milk proteins. In such case the mix after being compounded and before distribution is suitably sterilized, in any usual manner at a temperature below the temperature of objectionable decomposition or alteration of any ingredient present. Such a mix preferably contains a permissible preservative for the proteins or free amino acids present.

It will be understood also that the details given are for the purpose of illustration and that variations within the spirit of the invention are intended to be included within the scope of the appended claims.

What we claim is:

1. A food of high nutritive value comprising the proteins of cow's milk in substantially the proportions to each other in which they are normally present in cow's milk and admixed sources of cystine and tryptophane, providing approximately 1 to 3 parts of cystine and 0.2 to 1 part of tryptophane for 100 parts of the said proteins.

2. A food of high nutritive value comprising the proteins of cow's milk in substantially the proportions to each other in which they are normally present in cow's milk and admixed sources of cystine, tryptophane, arginine, isoleucine and glycine, providing approximately 1 to 3 parts of cystine, 0.2 to 1 part of tryptophane, 0.5 to 2 parts of arginine, 0.5 to 2 parts of isoleucine and 1 to 5 parts of glycine, for 100 parts of the said proteins.

RICHARD J. BLOCK.
ARTHUR P. HELLWIG.